United States Patent [19]
Waddan

[11] 3,869,501
[45] Mar. 4, 1975

[54] PROCESS FOR PREPARING 3-PENTENENITRILE

[75] Inventor: Dhafir Yusuf Waddan, Stockton-on-Tees, England

[73] Assignee: Imperial Chemical Industries Limited, London, England

[22] Filed: Aug. 27, 1973

[21] Appl. No.: 392,008

[30] Foreign Application Priority Data
Sept. 7, 1972  Great Britain.................... 41487/72

[52] U.S. Cl. ........................................... 260/465.3
[51] Int. Cl. ......................................... C07c 121/04
[58] Field of Search ................................. 260/465.3

[56] References Cited
UNITED STATES PATENTS
| | | | |
|---|---|---|---|
| 2,509,859 | 5/1950 | Coffman et al. ................ | 260/465.3 |
| 3,547,972 | 12/1970 | Drinkard, Jr. .................... | 260/465.3 |
| 3,558,688 | 1/1971 | Drinkard, Jr. .................... | 260/465.9 |
| 3,624,140 | 11/1971 | Baird, Jr. ...................... | 260/465.3 X |

*Primary Examiner*—Joseph P. Brust
*Attorney, Agent, or Firm*—Cushman, Darby & Cushman

[57] ABSTRACT

Organic nitriles are obtained by reaction of an olefin and hydrogen cyanide in the presence of a catalytic amount of a Group IB metal salt, especially a cuprous halide and an organic acid. With butadiene as the olefin the nitrile product contains more than 80% by weight of linear 3-pentene nitrile.

7 Claims, No Drawings

PROCESS FOR PREPARING 3-PENTENENITRILE

This invention relates to the manufacture of organic nitriles and, more particularly, to their manufacture by reaction of olefinic compounds with hydrogen cyanide in the presence of a catalyst.

United States Patent Specification No. 2,509,859 describes the reaction of butadiene and hydrogen cyanide in the presence of a halide of a metal of Group IB of the Periodic System, for example cuprous chloride, to give 3-pentene nitrile. Although the reaction is described as catalytic good yields of 3-pentene nitrile are obtained only if substantially equimolar proportions of butadiene and Group IB metal halide are used. With catalytic proportions, for example 0.006 moles of cuprous chloride per mole of butadiene, both the conversion of butadiene and the yield of 3-pentene nitrile are low.

We have now found that good yields of product are obtained using only catalytic amounts of Group IB metal salt if the said salt is used in conjunction with an organic acid.

Accordingly our invention provides a process for the manufacture of organic nitriles which comprises reacting an olefin with hydrogen cyanide in the presence of a catalytic amount of a Group IB metal salt and an organic acid.

The groups of elements referred to herein are those of the 'Long Form' of the Periodic Table of Mendeleev referred to at pages 23 to 24 and illustrated on the end plate of 'Advanced Inorganic Chemistry', second edition, by F. A. Cotton and G. Wilkinson (Interscience Publishers, New York, 1966). The Group IB metals from which the salts used in our process are derived are copper, silver and gold. The salts may be inorganic acid salts, for example the sulphates or phosphates, but especially the halides. Important halides are the chlorides, bromides and iodides, for example cuprous chloride, cuprous bromide, cuprous iodide, silver iodide and gold chloride. The cuprous halides are particularly important. Alternatively organic acid salts may be used, for example the salts of aliphatic acids, for example the acetates or lactates.

The organic acid used in conjunction with the Group IB metal salt is preferably a carboxylic acid. The acids may, for example by aliphatic, cycloaliphatic, araliphatic or aromatic acids. Particularly preferred, however, are carboxylic acids in which the carboxylic acid group or groups is attached to an organic residue containing up to three carbon atoms. The organic residue may be saturated or may contain ethylenic unsaturation. It may also carry substituents, for example halogen atoms, especially chlorine and bromine atoms. As specific examples of organic acids there may be mentioned acetic acid, propionic acid, butyric acid, oxalic acid, malonic acid, succinic acid, glutaric acid, chloroacetic acid, dichloroacetic acid, trichloroacetic acid, tribromoacetic acid and benzoic acid.

The organic acid may form a complex with the Group IB metal. In any event it is preferred that the organic acid is used in at least stoichiometric amount in relation to the Group IB metal. Substantially more than the stoichiometric amount may be used, however, especially where the organic acid is capable of acting as a solvent.

The process of our invention may be carried out over a wide range of temperatures, for example from −25° to 200°C, preferably from 20° to 150°C, and more preferably from 50° to 120°C. Owing to the volatility and toxicity of hydrogen cyanide the reaction is preferably conducted in a closed vessel under autogenous pressure or, if desired, under deliberately raised pressure, for example at a pressure of from 1 to 50 atmospheres. If desired a solvent may be used, for example a hydrocarbon solvent such as benzene, toluene or xylene or a nitrile solvent such as acetonitrile, propionitrile, benzonitrile or adiponitrile. Agitation of the reactants is desirable. The reaction is continued for a time sufficient to give a suitable conversion. In the case of a batch process the time will normally be for from 1 hour up to a period of several days, for example 5 days. If a supported catalyst is used the time of contact could be as low as a few seconds, for example 3 seconds.

The olefin and the hydrogen cyanide may be used in equimolar proportions or an excess of either may be used, especially within the molar range of olefin to hydrogen cyanide of 2:1 to 1:4. The Group IB metal salt is used in catalytic amount: this will normally fall within the range 0.0005 to 0.1 moles per mole of olefin. We prefer that the proportion of the said salt is from 0.005 to 0.05 moles per mole of olefin.

The organic nitrile formed in the process may be separated from the reaction mixture by first removing any excess olefin and/or hydrogen cyanide by distillation or by simply venting the apparatus. The organic nitrile may then be separated from catalyst residues by conventional methods such as filtration with or without extraction with solvent, or by distillation. The process may readily be adapted to continuous operation.

The process of our invention is particularly valuable for the conversion of butadiene to 3-pentene nitrile. Compared with the process of United States Patent Specification No. 2,509,859 the process of our invention enables the conversion to be effected in good yield using only a catalytic amount of Group IB metal halide, in conjunction with the organic acid instead of the equimolar amount required by the prior process.

3-Pentene nitrile is particularly valuable for further reaction with hydrogen cyanide in the presence of a catalyst to give adiponitrile. Adiponitrile may be hydrogenated to hexamethylene diamine, a valuable intermediate for polycondensation with dicarboxylic acids to give polyamides, especially, for example, with adipic acid to give polyhexamethylene adipamide (nylon 6,6), a well-known polyamide for use in the manufacture of mouldings and for melt spinning into synthetic fibres.

It has already been proposed to react butadiene and hydrogen cyanide in the presence of catalytic amounts of certain catalysts, for example certain zero valent nickel catalysts, as described, for example, in United Kingdom Specification No. 1,104,140. Such processes give mixtures of linear pentene nitriles, which are convertible by further reaction with hydrogen cyanide into adiponitrile, and branched methylbutene nitriles which cannot be converted directly to adiponitrile. The proportion of linear pentene nitriles compared with branched methylbutene nitriles produced in such processes is not normally greatly in excess of 70% by weight (or molar). It is an advantage of the process for our invention that the proportion of linear 3-pentene nitrile, directly convertible to adiponitrile, which is produced is much higher, usually at least 80% by weight (or molar). Moreover, the zero valent nickel catalysts used in the prior process are sensitive to moisture whereas the catalysts used in our process are not. Thus, anhydrous conditions are not required and it is

EXAMPLE 1

A mixture of 5.5 parts (0.101 moles) of butadiene, 5.6 parts (0.203 moles) of hydrogen cyanide, 0.5 parts (0.0025 moles) of anhydrous cuprous chloride, 0.5 parts (0.0030 moles) of trichloroacetic acid and 2 parts of acetonitrile was heated with agitation at 100°C in a closed vessel for 8 hours. After cooling to the ordinary temperature the vessel was vented to remove butadiene and hydroene cyanide. The residue (9.0 parts) was found by gas-liquid chromatographic analysis to contain 78% of 3-pentene nitrile (corresponding with a yield of 88.8% calculated on the butadiene charged) and only 4% of methylbutene nitrile.

EXAMPLE 2

A mixture of 5.5 parts (0.101 moles) of butadiene, 5.6 parts (0.203 moles) of hydrogen cyanide, 0.5 parts (0.0025 moles) of anhydrous cuprous chloride, 0.5 parts (0.0030 moles) of trichloroacetic acid and 2 parts of benzene was reacted at 100°C for 8 hours as described in Example 1. The product (4.6 parts) contained 74% of 3-pentene nitrile (corresponding with a yield of 37% based on the butadiene charged) and only 3% of methylbutene nitrile.

EXAMPLE 3

A mixture of 5.4 parts (0.10 moles) of butadiene, 5.4 parts (0.202 moles) of hydrogen cyanide, 0.5 parts (0.0025 moles) of anhydrous cuprous chloride and 2 parts (0.033 moles) of acetic acid was reacted as described in Example 1. The product (5.4 parts) contained 75% of 3-pentenenitrile (corresponding with a yield of 42% based on the butadiene charged) and only 4% of methylbutene nitrile.

EXAMPLE 4

A mixture of 5.4 parts (0.10 moles) of butadiene, 5.4 parts (0.202 moles) of hydrogen cyanide, 0.5 parts (0.0025 moles) of anhydrous cuprous chloride and 0.5 parts (0.004 moles) benzoic acid was reacted as described in Example 1. The product (1.9 parts) contained 75% of 3-pentenenitrile (corresponding with a yield of 23.4% based on the butadiene charged) and only 4.5% of methylbutenenitrile.

EXAMPLE 5

A mixture of 5.4 parts (0.10 moles) of butadiene, 5.4 parts (0.202 moles) of hydrogen cyanide, 0.5 parts (0.0025 moles) of anhydrous cuprous chloride and 2 parts (0.021 moles) of chloroacetic acid was reacted as described in Example 1. The product (6.1 parts) contained 76% of 3-pentenenitrile (corresponding with a yield of 56.7% based on the butadiene charged) and only 4.5% of methylbutenenitrile.

EXAMPLE 6

COMPARATIVE EXAMPLE

A mixture of 0.5 parts (0.0051 moles) of cuprous chloride, 2.07 parts (0.77 moles) of hydrogen cyanide and 5.52 parts (0.1022 moles) of butadiene was heated with agitation at 100°C in a closed vessel for 8 hours. After cooling to the ordinary temperature the vessel was vented to remove butadiene and hydrogen cyanide. The residue (0.3 parts) was found by gas liquid chromatographic analysis to contain 73% 3-pentenenitrile (corresponding with a yield of 2.6% based on the butadiene charged) and 4.1% 2-methylbutenenitrile.

EXAMPLE 7

COMPARATIVE EXAMPLE

A mixture of nickel tetrakis-tri-para-tolyl phosphite (0.6 parts) in benzene (3 parts) was cooled to −20°C and 15 parts of butadiene and 6 parts of hydrogen cyanide were added. The resulting mixture was heated with agitation at 100°C in a closed vessel for 8 hours. After cooling to the ordinary temperature the vessel was vented to remove butadiene and hydrogen cyanide. The residue (8.1 parts) was found by gas liquid chromatographic analysis to contain 3-pentenenitrile and 2-methylbutenenitrile in the molar ratio of 2:1.

I claim:

1. A process for the manufacture of 3-pentene nitrile which comprises reacting butadiene with hydrogen cyanide in the molar ratio 2:1 to 1:4 at a temperature within the range −25° to 200°C in the presence, as a sole catalyst, of from 0.0005 to 0.1 moles per mole of butadiene of cuprous chloride, bromide or iodide and a carboxylic acid selected from benzoic acid, oxalic acid and compounds having one or two carboxylic acid groups attached to a saturated or ethylenically unsaturated hydrocarbon residue containing up to three carbon atoms and which may be substituted by halogen.

2. The process of claim 1 in which the organic acid is used in stoichiometric amount in relation to the cuprous metal.

3. The process of claim 1 carried out in the presence of a hydrocarbon solvent or a nitrile solvent.

4. The process of claim 1 in which the carboxylic acid group is attached to a hydrocarbon residue containing up to three carbon atoms.

5. The process of claim 1 in which the carboxylic acid is benzoic acid.

6. The process of claim 4 in which the hydrocarbon residue is substituted by at least one chlorine or bromine atom.

7. The process of claim 1 in which the nitrile product contains at least 80% by weight of 3-pentene nitrile.

* * * * *

Disclaimer 3,869,501.—*Dhafir Yusuf Waddan*, Stockton-on-Tees, England. PROCESS FOR PREPARING 3-PENTENENITRILE. Patent dated Mar. 4, 1975. Disclaimer filed May 22, 1975, by the assignee, *Imperial Chemical Industries Limited*.

Hereby disclaims the portion of the term of the patent subsequent to Nov. 19, 1991.

[*Official Gazette August 5, 1975.*]